(12) United States Patent
Samuel (10) Patent No.: US 9,347,783 B2
(45) Date of Patent: May 24, 2016

(54) PET FRIENDLY SEARCH, MEETING, SOCIAL PROFILE MAPPING SYSTEM

(71) Applicant: BarkHappy, Inc., Chicago, IL (US)

(72) Inventor: Ninis Samuel, Chicago, IL (US)

(73) Assignee: BarkHappy Inc., Austin, TX (US)

( * ) Notice: Subject to any disclaimer, the term of this patent is extended or adjusted under 35 U.S.C. 154(b) by 72 days.

(21) Appl. No.: 14/481,172

(22) Filed: Sep. 9, 2014

(65) Prior Publication Data

US 2015/0073698 A1 Mar. 12, 2015

Related U.S. Application Data

(60) Provisional application No. 61/875,323, filed on Sep. 9, 2013, provisional application No. 61/905,349, filed on Nov. 18, 2013.

(51) Int. Cl.

| | |
|---|---|
| *G01C 21/34* | (2006.01) |
| *A01K 29/00* | (2006.01) |
| *H04L 12/18* | (2006.01) |
| *H04L 29/08* | (2006.01) |
| *A01K 15/02* | (2006.01) |
| *H04L 12/58* | (2006.01) |
| *G06Q 50/00* | (2012.01) |

(52) U.S. Cl.
CPC .......... *G01C 21/3438* (2013.01); *A01K 15/021* (2013.01); *A01K 29/00* (2013.01); *H04L 12/1813* (2013.01); *H04L 51/20* (2013.01); *H04L 67/18* (2013.01); *G01C 21/3476* (2013.01); *G06Q 50/01* (2013.01); *H04L 51/32* (2013.01)

(58) Field of Classification Search
CPC . G01C 21/3438; G01C 21/3476; G06Q 50/01
See application file for complete search history.

(56) References Cited

U.S. PATENT DOCUMENTS

| | | | |
|---|---|---|---|
| 6,424,910 B1 | 7/2002 | Ohler | |
| 7,058,507 B2 | 6/2006 | Saiki | |
| 7,577,666 B2 | 8/2009 | Overton | |
| 7,606,661 B2 | 10/2009 | Kwak | |
| 7,729,708 B2 | 6/2010 | Jung et al. | |
| 8,204,682 B2 | 6/2012 | Hatami | |
| 8,494,764 B2 | 7/2013 | Lappe et al. | |
| 8,577,589 B2 | 11/2013 | Shin et al. | |
| 8,812,021 B2 * | 8/2014 | Williams | H04W 4/023 455/456.1 |
| 9,264,849 B1 * | 2/2016 | Kahn | G06Q 10/1095 |
| 2005/0202834 A1 | 9/2005 | Sudit | |
| 2009/0105941 A1 * | 4/2009 | Johnston | G01C 21/3438 701/533 |
| 2011/0028132 A1 | 2/2011 | Bos | |
| 2011/0113148 A1 * | 5/2011 | Salmela | G01C 21/3438 709/229 |
| 2012/0204112 A1 | 8/2012 | Levine et al. | |

* cited by examiner

*Primary Examiner* — Todd Melton
(74) *Attorney, Agent, or Firm* — Garlick & Markison; Harry S. Tyson, Jr.

(57) ABSTRACT

A method and system for assisting users with determining a convenient location for a meeting between at least two users having dogs, the method and system including providing an initial location (via GPS) for a first user and dog, providing an initial location (via GPS) for a second user and dog, determining a meeting point between the first users and the second user, and providing directions to the meeting point to the first user and the second user, via electronic devices. Preferably the meeting point is a dog friendly point of interest. The system may also provide social profiles of users, including dogs and their owners. The system provides search, social networking, and mapping for dog owners.

20 Claims, 7 Drawing Sheets

PET FRIENDLY SEARCH, MEETING, SOCIAL PROFILE MAPPING SYSTEM

RELATED APPLICATIONS

This application claims the filing priority of U.S. Provisional Application Nos. 61/875,323, entitled "Dog Walking/Meeting App", filed Sep. 9, 2013 and 61/905,349, entitled "Search and Social Profile Mapping for Baby and Dog Friendly Points of Interest and their Parents", filed Nov. 18, 2013. The complete disclosure provided in each of the referenced provisional applications is hereby incorporated by reference.

TECHNICAL FIELD OF THE INVENTION

The present invention is directed to the field of directional and/or mapping processes and systems for operation on electronic devices, such as smart phones and similar devices. More specifically, the present invention relates to a search, social profiling, mapping and meeting method for dogs accompanied by their owners.

BACKGROUND OF THE INVENTION(S)

Typical mapping and navigation application ("apps") and services today only focus on humans, ignoring other potential beneficiaries such as dogs. Such apps are meant to be first person experiences, managing your own location or your own social profile on a map. A 2011 survey by the American Veterinary Medical Association (AVMA) estimated that there are over 43 million households in the United States, or about 36.5% of total U.S. households, with at least one dog. In 2012, a study done by a consumer group estimated that 22% of the World's population, about one out of every five people, will own a smartphone by 2013.

These numbers, while seemingly unrelated, represent two great passions and trends in American and World culture. However, there is no current solution that allows social profiles and mapping services for dogs managed on their behalf by their owner/human. In addition, there are currently no apps or mapping programs that combine social profiles for dogs on a map with live location data or dog friendly points of interest used for meeting point determination. Current GPS and location technology is used with dogs only for lost and found tracking purposes. There needs to be a solution that allows the placement of dog social profiles based on location, on a map that can be managed on behalf of a dog by a human (their owner) that can also allow interaction between dog friendly points of interest and meetings and interactions between two or more dogs.

Also, typical current mapping solutions only provide single direction point navigation, such as one person to a single point of interest, or in some cases, one person to the location of another person, or between two cars. None of these systems have been applied in any way to dogs. In addition, although a mapping or navigation system may provide points of interest, there is often no way to determine whether that point of interest is dog friendly. There are currently no apps/services that enable near instantaneous in-person meetings between dogs and for dog owners to meet. It would be desirable to provide social profiles based on locations, which are also searchable by a set of traits, so that owners of dogs can potentially meet. The present disclosure provides these solutions.

As described more fully below, the present invention provides a mapping and social profile system which performs multiple functions in conjunction with a smartphone without sacrificing portability features, design, style or affordability.

SUMMARY OF THE INVENTIONS

Disclosed herein are improved systems and methods which avoid the disadvantages of prior devices while affording additional operating advantages. Social profile, search, and location finding systems and methods for dogs are disclosed. In one example, the system is in conjunction with a mobile app on a smartphone (or tablet) that provides search, social networking, and mapping for dogs and their owners.

The novel concepts and architectures presented below are not a natural extension of any existing mapping or navigation inventions, and change previous assumptions in mapping and social profiles from simply a first person experience to include a new perspective involving a secondary party not able to use a device like a smartphone and unable to manage a social profile on their own. Although the disclosure references dogs as the secondary party, certain embodiments could be extended to other secondary parties, such as babies.

In an embodiment, a method of assisting users with determining a convenient location for a meeting is disclosed. The method comprises the steps of providing an initial location for a first user, providing an initial location for a second user, determining a midway point between the first users and the second user, and providing directions to the midway point to the first user and the second user enabling the users to meet at the midway point.

In another embodiment, a location mapping system is disclosed. The system comprises an electronic device having processing circuitry to implement a mapping capability(ies), a program stored in memory of the electronic device which complements the operation of the mapping capability, including a mapping location for a first user, a mapping location for a second user, at least one point of interest location at a distance midway between the mapping location of the first user and the mapping location of the second user, wherein the program provides directions on the electronic device based on the mapping locations of the first user and the second user relative to the point of interest enabling the first user and the second user to reach the midway point of interest. Alternatively, the program is accessible through the Internet or stored as a cloud-based program.

This technology can be a feature or function within a larger application or software program. In addition this technology function can exist on various platforms including Apple iOS®, ANDROID™ ("Android"), Windows, and other proprietary software platforms or web based code.

A location finding system and method for users to find dog friendly points of interest, and to provide social profiles of users, including dogs and their owners, based on location, is disclosed. In one example, the system includes a mobile app that provides search, social networking, and mapping for dog owners.

In another embodiment, a location mapping and social profile system, is disclosed. The system comprises an electronic device having mapping capability, a program stored on the electronic device which complements the operation of the mapping capability, wherein the program is capable of creating a social profile for a user, a mapping location for the first user, and a searching feature wherein the social profile of the user can be located by a second user based on a GPS location.

In yet another embodiment, a location mapping and social profile system for dogs and their owners is disclosed. The system comprises an electronic device having mapping capability, a program stored in the electronic device which complements the operation of the mapping capability, wherein the program is capable of creating a social profile for the dog and its owner, a mapping location for the dog and its owner based on real time location data, and a searching feature wherein the social profile of the dog and its owner are located based on GPS location.

This technology can be a feature or function within a larger application or software program. In addition this technology function can exist on various platforms including Apple iOS®, Android, Windows, and other proprietary software platforms or web based code.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION

The following descriptions of detailed embodiments are for exemplifying the principles and advantages of the inventions. They are not to be taken in any way as limitations on the scope of the inventions. The invention, in its several embodiments, is primarily described in the following text and appended drawings as a component which operates in conjunction with a smart phone or tablet. However, the disclosed system and methods can also be implemented on personal computers including a software application for personal computers, or it may reside on a hosted (server) site as an Internet-based application. Similarly, while it is primarily described as a supplement to existing navigation programs, it is equally suitable for stand-alone operation with minor changes which would be understood by those skilled in the art.

The disclosure includes a method that provides a convenient midway or halfway meeting point between two or more dogs on a map allowing them to meet, via their respective owners, at a convenient location. The display of dog friendly points of interest and specific dog social profiles on a map managed by owners is another exemplary beneficial feature.

In a specific embodiment, the system has multiple components and features. For example, the system:

allows the creation, mapping and search of social profiles of dogs and for them to be managed on their behalf by their human owners and searchable by various traits;

displays dog friendly points of interest and businesses that can be searched by category based on location and for use in meeting point determination including unique icons and POI profile dog friendly information;

allows multiple dogs to meet at a logical dog friendly meeting point, mid-way between their locations, if chosen, instead of one dog going all the way to the other dog's location. This saves traveling time and distance, and allows for a faster more efficient meeting. In cases where there are more than two dogs involved, it becomes beneficial to have a mutual logical meeting point versus having to independently determine a meeting point. The present invention uses the location of each dog involved and establishes and recommends the best central meeting point between the dogs. The dog owners can decide to use the recommended meeting point and then get navigation directions to that point, or change and recommend a different meeting point; and uses a GPS location of each of the dogs based on either the smartphone of their owner or a GPS enabled sensor on the dog and determines the distance between them. It then calculates the exact halfway distance between the parties along what would be a typical one way navigation route. It then processes proprietary dog friendly point of interest and business listings data to search and recommend a logical meeting point within the distance along the route, so that all parties travel the same or nearly the same distance to each other.

Referring to FIGS. 1-6, a key function of the present system and method is to provide a system and method, including software, to assist dogs and dog owners in finding a convenient halfway or midway meeting point, as well as provide navigational directions between two or more users on a map allowing them to meet in person. The users can be two or more dogs (with connection to the owners). The directions given can be on foot, such as walking directions. Alternatively, aspects of the present invention can also be stored and accessible in the cloud.

Figure 1:
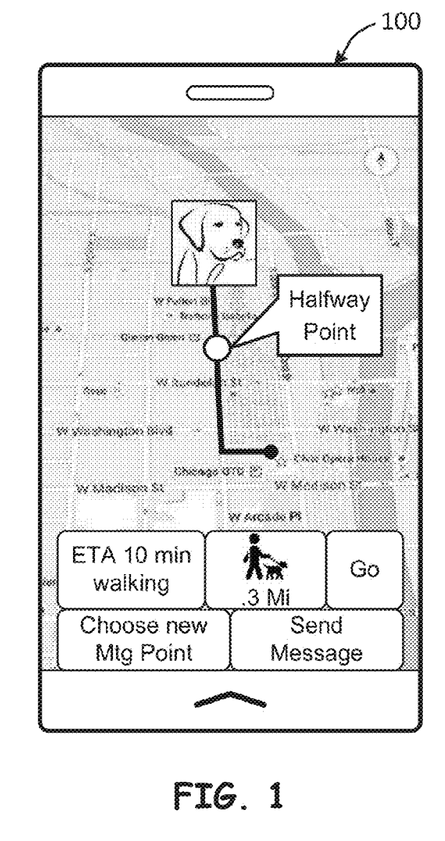
FIGS. 1-3 are screen shot images showing a possible embodiment of mapping operations of the present system.
Figure 2:
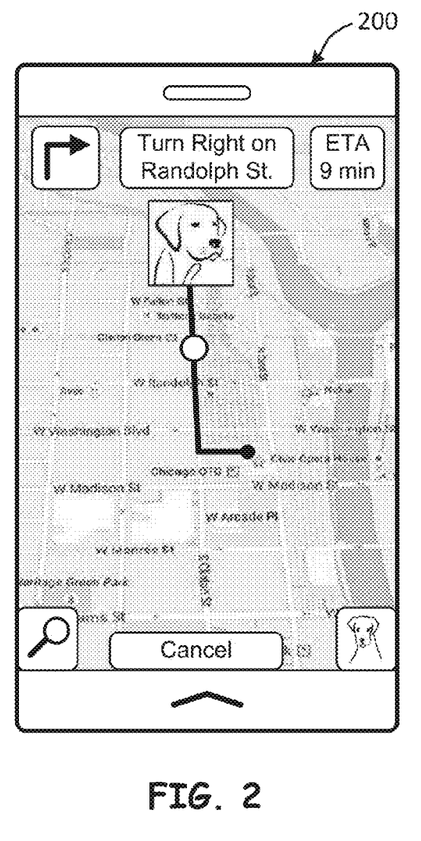

Referring to FIGS. 1 and 2, screen shot images 100 and 200 are shown in which a system according to the present invention establishes the location of each of two dogs and the distance between them. Software, which can be executed on a suitable mobile device, including a tablet or smart phone, accessible through the Internet (via a cloud-based server(s)), or as a cloud-based server software, then calculates the halfway distance between the dogs. It then searches proprietary dog friendly map data and business listings to find and recommend a logical meeting point within this distance, so that all parties travel the same or nearly the same distance to each other.

Figure 4:
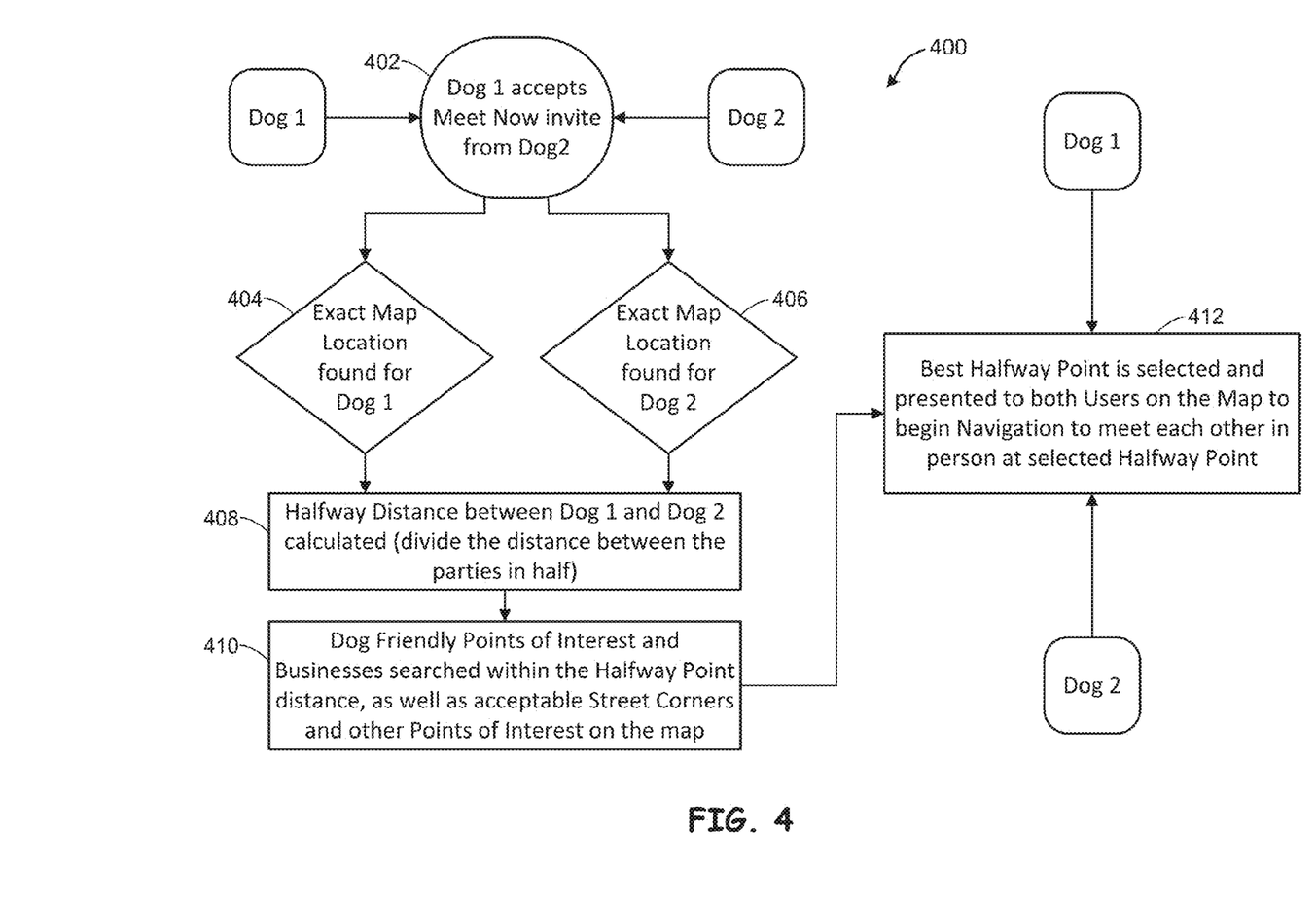
FIG. 4 is a flow chart illustrating exemplary interaction between two users to determine a meeting spot.

For example, and with reference to the flow chart 400 of FIG. 4, the mobile app is used for connecting two users ("Dog 1" and "Dog 2") walking their dogs. After Dog 2 accepts an invitation to meet from Dog 1 (402), the app notes the map location of the two users (404 and 406). It then looks for dog friendly points of interest (POI) (410) that are at a halfway distance point (calculated at 408) and recommends one of these dog friendly businesses or areas as the halfway meeting point. The halfway meeting point is selected and presented (412) to both "Dog 1" and "Dog 2," who then begin navigation to meet each other in person at the selected halfway point. The parties should both have approximately the same distance to travel to meet each other at this halfway meeting point.

If there is no dog friendly business or POI at exactly the halfway point between the parties, the app looks at locations within, for example, no more than a two block radius of the halfway meeting point (this radius distance can be adjusted). If there is no dog friendly POI within this halfway point area, the software searches for an acceptable street corner or other POI on the map and establishes that as the halfway meeting point. The logic may ensure the existence of a sidewalk or POI so as not to use highways or roads as meeting points. All of this is calculated and processed automatically for the user instantly. Once the halfway meeting point is established on the map and presented to the parties involved, navigation directions (on foot or by car or other, such as mass transportation) are offered to each of the parties to begin their travel to meet in person.

Figure 3:
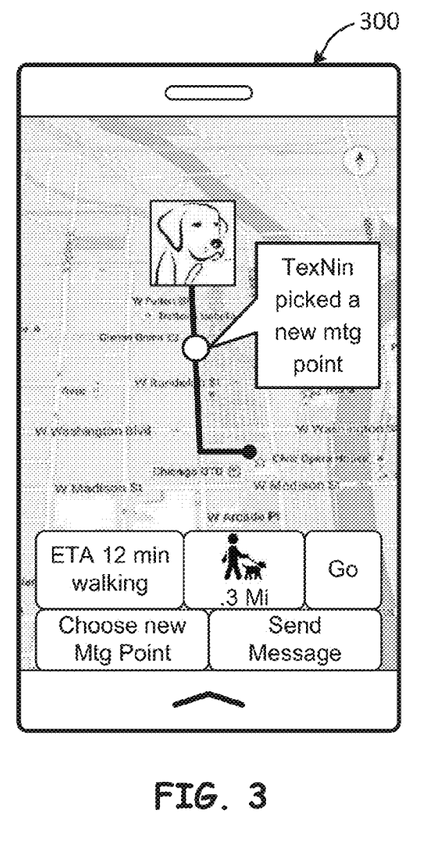

Referring now to the screen shot image 300 of FIG. 3, if one of the dog owners does not want to use the established halfway point, he or she can choose a new meeting point by simply moving the meeting point with his/her finger on the map. The new point is then recommended to the other user(s) to accept or decline. If the second or other user(s) accepts the change, a new meeting point is established.

Another unique aspect of the invention, in addition to calculating and finding a midway or halfway point, is that it provides the best recommended central meeting point. It applies smart logic based on available data points. This logic may be based on having proprietary dog friendly data from the map, business listings, street information, POIs, etc. For example, the BARKHAPPY® mobile app uses a database of dog friendly businesses and points of interest to first search those that are located at the halfway/midway point for mutual dog walking users.

A first level of logic will choose from dog friendly parks, bars, restaurants, and stores first, followed by all other miscellaneous dog friendly POIs along the route. A second level of logic is used if no dog friendly POIs exist at the midway point (or within a 2 block radius). This second logic uses any existing businesses or POIs that exist at that location, calling upon existing public map data, and avoids using highways or points in middle of streets. This logic identifies businesses or street corners that are accessible on foot. In addition to choosing one meeting point, the logic involved can provide parties with multiple meeting points to choose from instead of just one. In this manner, the present app offers a number of options for the user to choose from when deciding on a meeting place.

In addition to providing a system and methods to assist users in the search and display of dog friendly points of interest and businesses, an embodiment of the invention also provides searchable social profiles for dogs and their owners.

Figure 5:
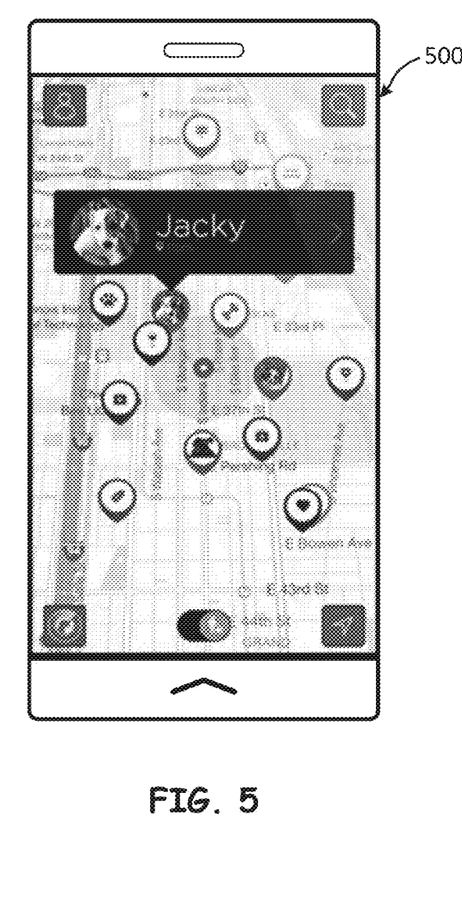
FIG. 5 is a screen shot image showing an embodiment of the social component of the present system with a proximity feature.

FIG. 5 illustrates a screen shot image 500 showing an embodiment of the social component of the present system with a proximity feature which displays dog friendly points of interest (POI), as indicated by a marker such as a paw print, as shown. In operation, the location of the dog owner with the dog is found using the GPS on a smartphone which is running, for example the "BarkHappy" app. This allows the device to identify the dog as "nearby" to other users as well. The locations of the dog friendly places and points of interest are pulled from a proprietary set of data used by the app, which then places the points of interest on a map with the unique markers depending on the category.

In addition, the POI of various categories may be pulled from a managed database. The database may be accessed when a user does a search. Items are placed on the map using respective addresses, and the icon used depends on its category.

Figure 6:
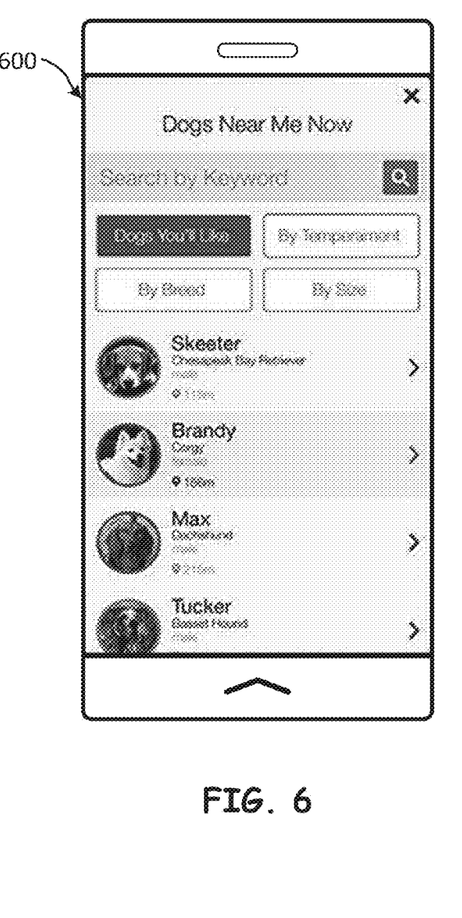
FIG. 6 is another screen shot image showing a search feature of the social component of the present system.

FIG. 6 illustrates another unique feature of the present system. This feature is the location-based display 600 of a social profile for a dog and/or dogs along with their owner(s) profile(s). The profiles are preferably searchable by a variety of traits.

The social profile display by location function is also unique in that it uses the dog owners GPS location from the smartphone as well as the city and state location identified in their profile created by the user. Alternatively, the location may be determined by a small sensor attached to the dog. When searching for "Dogs" nearby, a list of dogs nearby may be shown by distance and other factors (see FIG. 6). The dog profiles in the list are found using GPS location of the dog owners smartphone, for example. Users have the option to turn this feature off and not be shown in the list and decide whether to be visible to the public or not. The display also provides recommended profiles of potentially compatible dogs based on multiple traits including age, location, breed, temperament, size and gender.

Once a user sees another dog profile of interest, the user can open the profile, which allows the user to see pictures of the dog and owner, and preferably read information about the dog, such as age, breed, gender and temperament. The user can then decide to add the dog as a friend in the "pack" or possibly meet for an instant play date.

Also as shown in FIG. 5, the app may display social profiles of dogs on a map using real time location data and a unique map marker such as the dog's photo. The location of these dogs is found using the GPS location from their owner's smartphone, or can be found using Bluetooth enabled proximity sensors attached directly to the dog's collar, leash or body, which then sends data to the app via a smartphone. If smartphone GPS location is used, the owners of the dogs are assumed to be with their respective dogs unless specified otherwise. There is a feature/function in this technology that allows the owner to designate whether or not their dog is out with them. The live location is constantly updated and location may be known/displayed in approximate real time. These profiles can be represented in many ways on the map, including by map point marker, dog profile photo, owner photos or other means of representing the location of one or more dogs. In addition to the location, the technology may gather historic data on locations visited.

There are currently no apps or mapping programs that combine social profiles for dogs on a map with live location data. The present invention uses GPS technology for social purposes and enables a full profile of a dog including pictures, age, and other traits or preferences, as well as descriptive details about the dog and the dog's owner. This allows other users of the app and/or the dog's owner and friends to see their approximate real time location and open the dog's or dogs' profile. The user can then message or meet with other dogs and their owners. This solution is unique as no current technology or mobile app solutions offer an experience that maps dog profiles on a map for social purposes.

The profile itself is first created by one or more users of the app, who have the ability to upload pictures and descriptive information about their dog or dogs, as well as information about themselves. The profile photo they choose may be used in the map marker to identify the dog to other users. Even though the user can designate a location (city, state) or it can be found using FACEBOOK® information, the actual live location is obtained through the GPS information of the smartphone. This feature permits the owner of the dog to find and possibly meet with other dog owners in a nearby location.

The technology uses the GPS location from a smartphone or similar GPS enabled mobile device which is running the app (in this case, the mobile app called BARKHAPPY®.) The technology in the BARKHAPPY® app then displays this location on a map in a map marker using the dogs profile photo (this can also be a map marker point or another image instead of photo). The smartphone is assumed to be with the dog's owner and the dog is assumed to be with the owner.

There is also a feature in the app that allows the user of the app to toggle "out with my dog" as on or off. If the toggle is on, then the location of the dog is found and displayed on the map or shown as "nearby" to other users. If the toggle is off, location is not received and the dog profile is not displayed on the map or shown as "nearby".

Users of the app can also search for potentially compatible owners and dogs using a variety of traits. For example, breed, age, gender, and personality characteristics can be set up as searchable traits within the app. Thus, users can search for other owners and their dogs based on a series of traits.

There is currently no solution for owners of dogs looking for dog friendly POIs. The disclosed system displays dog friendly points of interest and businesses nearby using special markers on a map with useful information across various categories including, but not limited to the following: bars & restaurants; parks and playgrounds; medical services; events and entertainment; doggie daycare; and shopping. Dog owners out walking with their dogs can use these locations to potentially meet with other dog owners having similar interests, as determined using the social profile feature.

Referring now to FIGS. 7-10, several exemplary screen shot flow diagrams are shown to help illustrate features of the present invention. Specifically, the "Login-Sign In/Up" feature (FIG. 7), the "Create Profile" feature (FIG. 8), the "Map View" feature and the "Business POI" feature (FIG. 9), and the "Dog POI" feature and the "Play Invite" feature (FIG. 10) are all shown.

Figure 7:
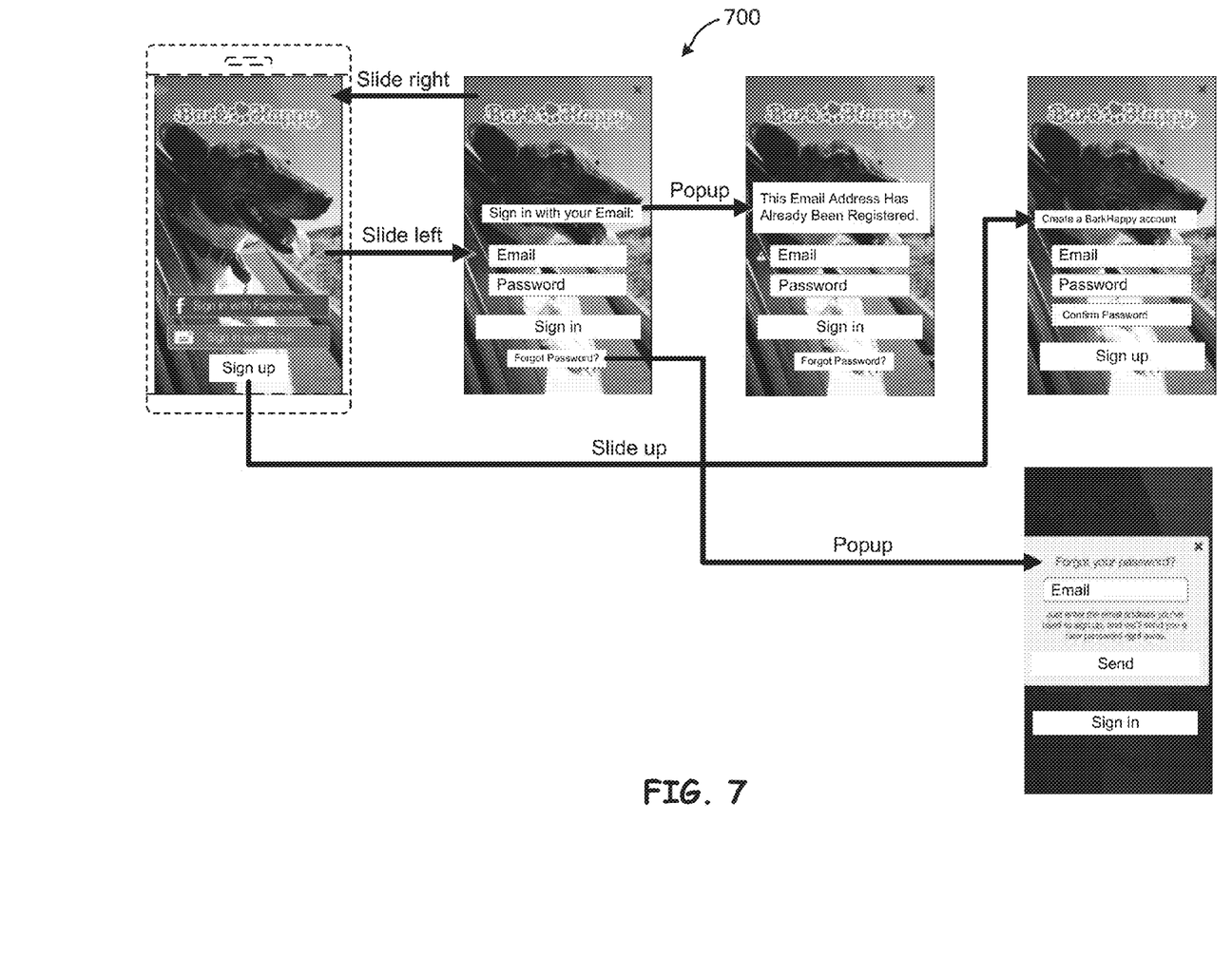
FIG. 7 is a sequence of screen shots from an exemplary application of a login and/or sign-in/up feature of the disclosed invention.

FIG. 7 is an exemplary diagram 700 of a login and/or sign-up/in sequence which is explained in greater detail below:

Login—Sign In/Up:
  'Sign in with facebook' takes the user directly to step 2 after successful login.
  'Sign in with email' slides in the form fields from the right (tapping 'x' will slide in the previous screen from the left).
  If the user enters the wrong Email address or password, a transparent popup will show an error message and an icon will indicate on which field the error occurred.
  If the user tabs 'Sign Up', the sign up form slides in from the bottom (tapping 'x' will slide the splash screen buttons in from the top).
  If the user tabs on 'Forgot password', a full screen popup will open and prompt the user to enter an email address.
  All buttons should be disabled (50% transparent) until all required fields are filled.

Figure 8:
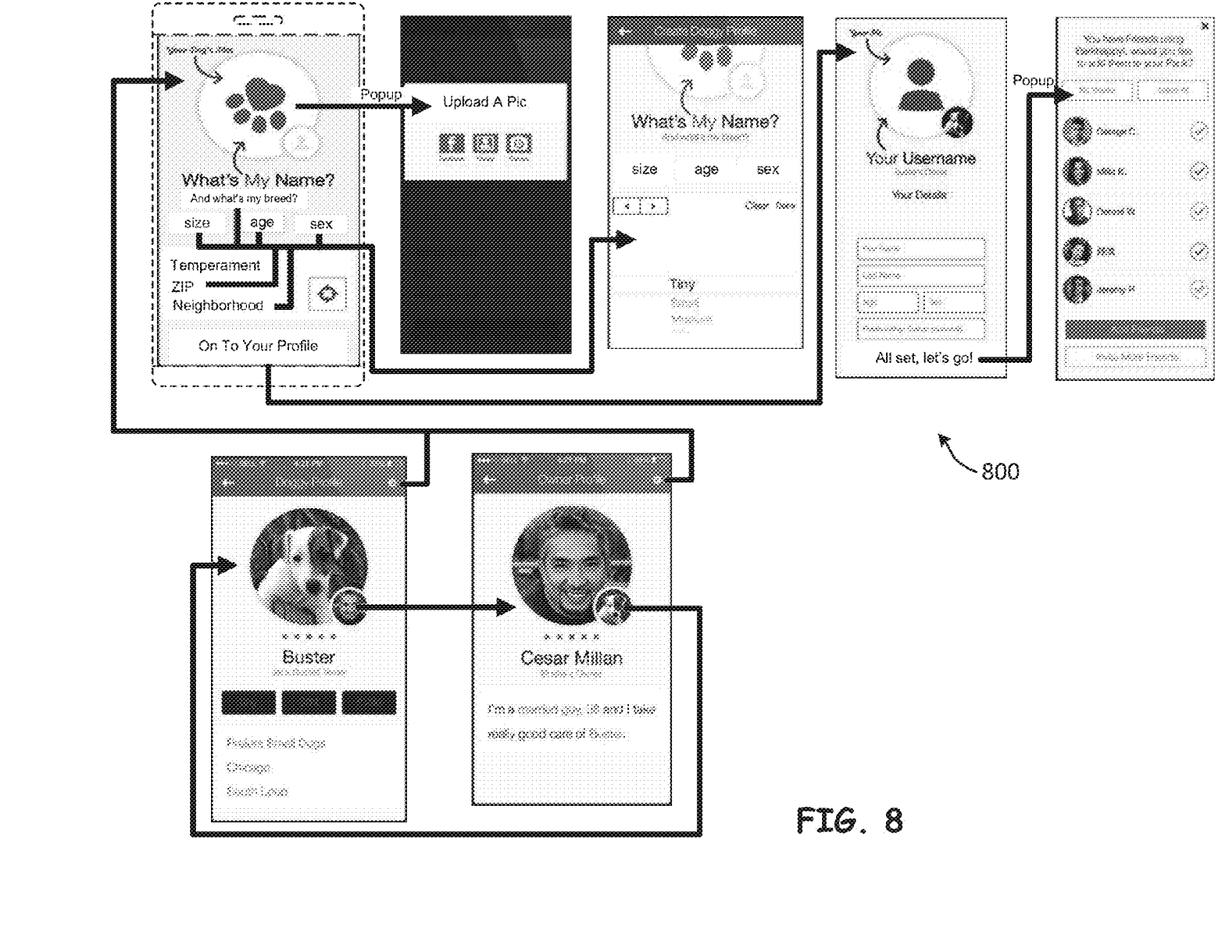
FIG. 8 is a sequence of screen shots from an exemplary application of a profile creation feature of the disclosed invention.

FIG. 8 is an exemplary diagram 800 of a profile creation sequence which is explained in greater detail below:

Create Profiles:
  Tapping the blank avatar opens a popup and lets you upload images from facebook or the phone library, or allows you to use the camera to take a picture.
  Small avatar image is disabled (if user is logged in with facebook it will show the FB avatar).
  Tapping 'what's my name' will open the iOS keyboard and lets the user enter a name (will replace the 'what's my name' text).
  Tapping on any of the other fields will open the iOS picker showing lists to choose info from.
  Optional: 'Locator' icon will prompt 'allow access to your location' popup and if accepted, fill 'ZIP' and 'neighborhood' fields automatically.
  Once the user hits 'on to your profile' all content (avatars, name, breed, etc.) flip horizontally to the left and show a blank user profile.
  If user is logged in with facebook, image, name, age and sex fields are filled automatically, 'relationship status' field will prompt a picker.
  'Busters Owner' field will be automatically filled with the name from the Doggy Profile.
  Once completed a popup opens and asks the user to add friends that use BarkHappy or invite other friends.
  The popup closes and the Map View shows.

Figure 9:
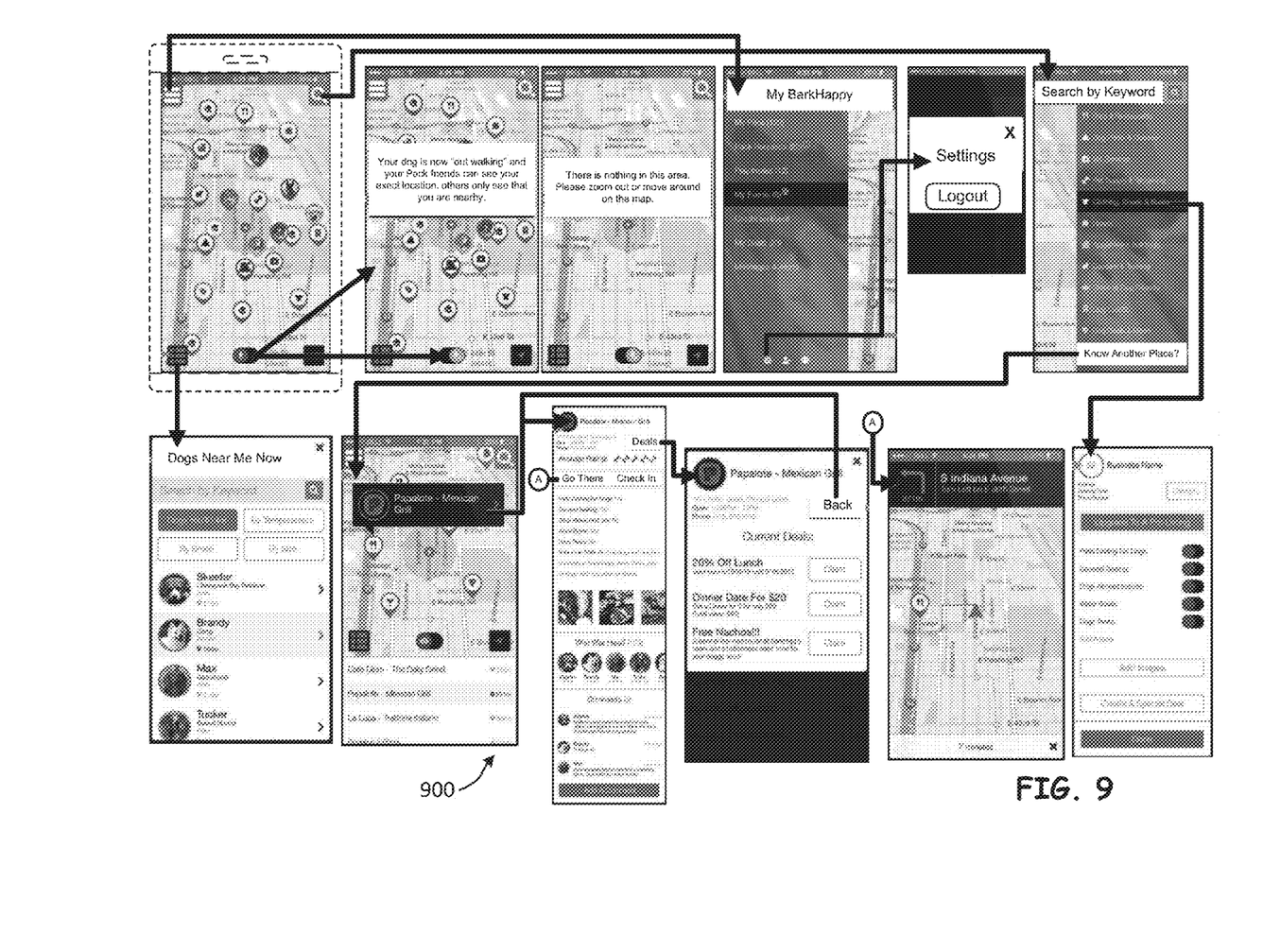
FIG. 9 is a sequence of screen shots from an exemplary application of a map view feature and a business point-of-interest (POI) feature of the disclosed invention.

FIG. 9 is an exemplary diagram 900 of a map view feature and a business point-of-interest feature sequence which are both explained in greater detail below:

Map View:
  Bottom toggle button lets the user switch between 'visible' and 'invisible' status. Once switched, a transparent popup shows for 2 seconds and then fades out automatically.
  If the user navigates to an area without POI, a transparent popup will inform him that there is no POI. Once there are POIs back on the map, the popup will fade out.
  If the user tabs the top left icon, the 'My BarkHappy' menu opens by sliding the map out of the screen (to the right).
  Tapping the 'Settings' icon will open a popup that lets the user logout.
  If the user tabs on the top right icon, the 'Search' menu opens by sliding the map out of the screen (as above but to the left).
  Tapping on an item will slide the map back and only the requested POI(s) are shown.
  If the user taps on the bottom left icon, a popup opens showing POIs nearby.

The business point-of-interest (POI) feature sequence is described below:

Business POI:
  If the user taps on a map pin, a transparent 'tooltip' popup opens and gives avatar and name of the selected POI.
  If the user taps the 'tooltip' a full screen popup shows with all the POI details.
  Tapping on the 'Go there' button closes the popup and shows GPS info on the map.
  Tapping on the 'deals' button flips the popup horizontally (left) and shows the deals details.
  Tapping the 'back' button on the deals screen flips the popup (right), back to the POI info screen.

Figure 10:
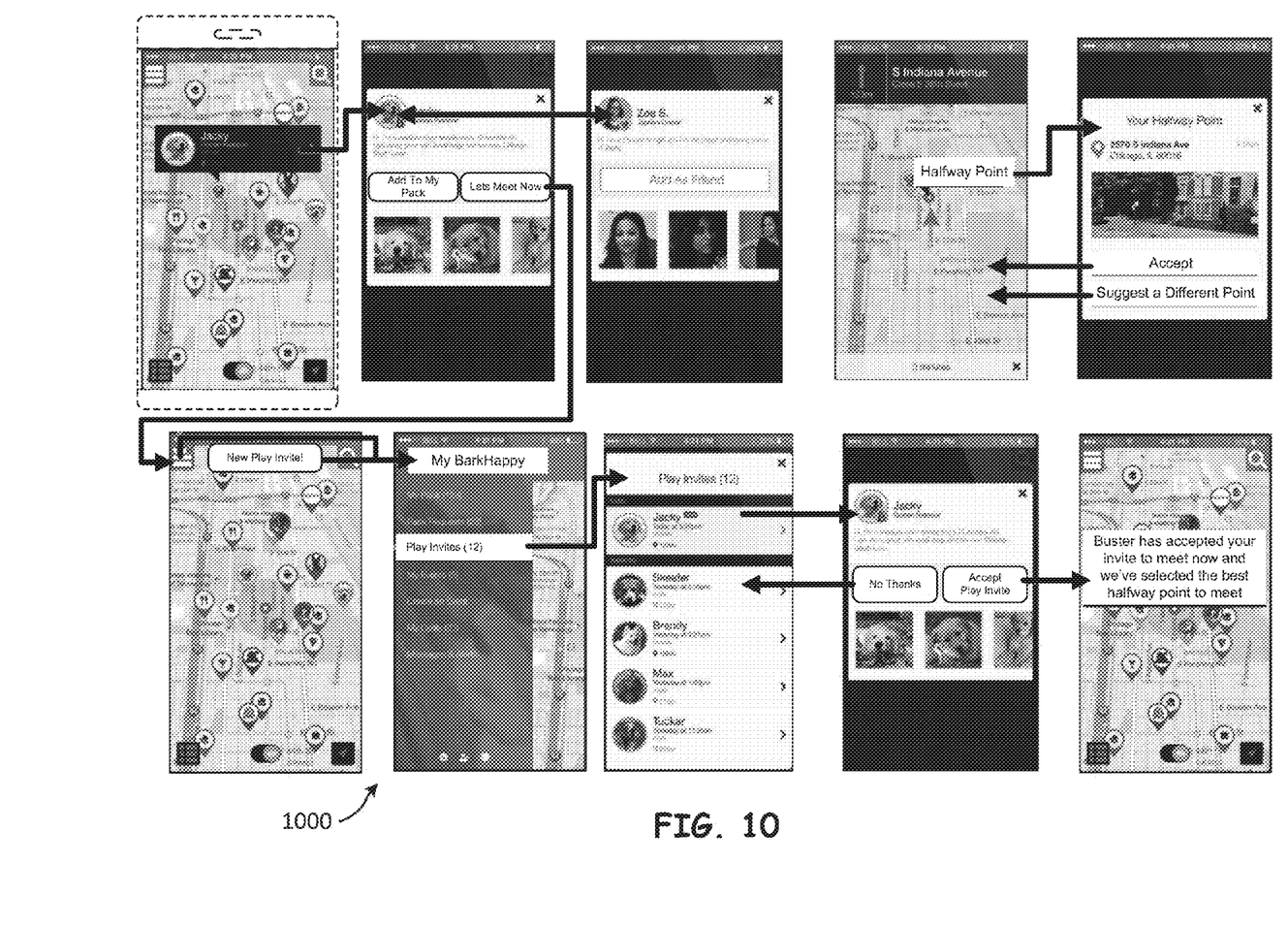
FIG. 10 is a sequence of screen shots from an exemplary application of a dog point-of-interest (POI) feature and a play invitation feature of the disclosed invention.

FIG. 10 is an exemplary diagram 1000 of a dog point-of-interest (POI) and play date invitation sequence which are explained in greater detail below:

Dog POI:
  If the user tabs on a map pin, a transparent 'tooltip' popup opens and gives avatar and name of the selected POI.
  If the user tabs the 'tooltip' a full screen popup shows with all the POI details.
  Tapping on the avatar will flip the popup from 'Doggy Profile' to 'User Profile' and back.
  Tapping 'Add to My Pack' sends a friend request and shows a transparent popup for 2 seconds that then fades out automatically.

The play invitation sequence is explained below:

Play Invites:

Users gets alerted that he has a new play invite. Indicated with an icon on the My BarkHappy icon and with a transparent popup that shows for seconds and then fades out.

If the user taps on either one of those, the My BarkHappy menu opens (as described above).

If the user taps on 'Play Invites' and a popup opens displaying all play invites.

If the user taps on a play invite, the popup flips horizontally (left).

If the user declines or taps 'x', the popup flips horizontally (right), back to the previous screen.

If the user accepts the invite, the popup closes and the GPS map shows with a meeting point selected and a transparent popup info message (showing for 2 seconds and then fading out).

If the user taps on the Halfway Point 'tooltip' a popup opens and asks the user to accept or suggest a different meeting point.

This invention can embody many different forms and applications, and should not be limited to the embodiments described here. In the described embodiments, it is specifically applied to a mobile app for locating dog friendly points of interest, such as through the BARKHAPPY® mobile app, but can also be used by anyone using an online map or mobile app to connect with and meet other people having similar interests. It is also useful as a social networking tool through its display of social profiles for dogs and dog owners. Additional applications can include any number of possibilities where users from remote locations wish to find a convenient midway point for meetings, coffee, lunch, dinner, etc.

What is claimed is:

1. A method of determining a convenient meeting location for dogs via mobile devices of dog owners, the method comprising:
   receiving first geolocation information from a first mobile device proximate a first dog, wherein the first geolocation information is derived, at least in part, from electronic data received from a sensor attached to the first dog;
   receiving second geolocation information from a second mobile device proximate a second dog;
   determining an initial location of the first dog based on the first geolocation information;
   determining an initial location of the second dog based on the second geolocation information;
   calculating a distance between the first dog and the second dog based on the initial location of the first dog and the initial location of the second dog;
   identifying a meeting point for the first dog and the second dog based on the calculated distance, wherein the meeting point is approximately equidistance from the initial location of the first dog and the initial location of the second dog;
   generating first routing information identifying a travel route between the initial location of the first dog and the meeting point;
   generating second routing information identifying a travel route between the initial location of the second dog and the meeting point;
   communicating the initial location of the second dog, the meeting point and the first routing information for visual presentation on the first mobile device; and
   communicating the initial location of the first dog, the meeting point and the second routing information for visual presentation on the second mobile device.

2. The method of claim 1, further comprising:
   identifying at least one point of interest proximate the meeting point; and
   communicating the at least one point of interest for visual presentation on the first mobile device and second mobile device.

3. The method of claim 2, wherein the at least one point of interest is identified from a curated database of dog-friendly points of interest.

4. The method of claim 2, further comprising:
   identifying additional points of interest proximate the travel route between the initial location of the first dog and the meeting point and the travel route between the initial location of the second dog and the meeting point; and
   communicating the additional points of interest for visual presentation on the first mobile device and the second mobile device.

5. The method of claim 1, further comprising:
   receiving a request, from the first mobile device or the second mobile device, to identify a new meeting point;
   in response to the request, identifying a new meeting point; and
   communicating the new meeting point for visual presentation on the first mobile device and the second mobile device.

6. The method of claim 1, further comprising:
   communicating profile information relating to the second dog for presentation on the first mobile device.

7. The method of claim 1, further comprising:
   receiving a request, from the first mobile device, to meet with the second dog; and
   receiving, from the second mobile device, an acceptance of the request.

8. The method of claim 1, wherein the electronic data received from a sensor attached to the first dog indicates that the first dog is proximate the first mobile device.

9. A server supporting an application installed on a first mobile device and a second mobile device, the server comprising:
   a communication interface configured to operate via a network to communicate with and receive information from the first mobile device and the second mobile device;
   processing circuitry operably coupled to the communication interface;
   memory coupled to the processing circuitry; and
   program code stored in the memory, wherein the processing circuitry and communications interface operate according to the program code to:
   receive first geolocation information from the first mobile device, the first geolocation information derived, at least in part, from electronic data received from a sensor attached to a first dog;
   receive second geolocation information from the second mobile device, the second mobile device proximate a second dog;
   determine an initial location of the first dog based on the first geolocation information;
   determine an initial location of the second dog based on the second geolocation information;
   calculate a distance between the first dog and the second dog based on the initial location of the first dog and the initial location of the second dog;

identify a meeting point for the first dog and the second dog based on the calculated distance, wherein the meeting point is approximately equidistance from the initial location of the first dog and the initial location of the second dog;

generate first routing information identifying a travel route between the initial location of the first dog and the meeting point;

generate second routing information identifying a travel route between the initial location of the second dog and the meeting point;

communicate the initial location of the second dog, the meeting point and the first routing information for visual presentation on the first mobile device; and communicate the initial location of the first dog, the meeting point and the second routing information for visual presentation on the second mobile device.

10. The server of claim 9, wherein the processing circuitry and the communications interface further operate according to the program code to:

identify at least one point of interest proximate the meeting point; and communicate the at least one point of interest for visual presentation on the first mobile device and second mobile device.

11. The server of claim 10, the memory maintaining a database of dog-friendly points of interest, wherein the at least one point of interest is identified from the database of dog-friendly points of interest.

12. The server of claim 9, wherein the processing circuitry and the communications interface further operate according to the program code to:

identify additional points of interest proximate the travel route between the initial location of the first dog and the meeting point and the travel route between the initial location of the second dog and the meeting point; and communicate the additional points of interest for visual presentation on the first mobile device and the second mobile device.

13. The server of claim 9, wherein the processing circuitry and the communications interface further operate according to the program code to:

receive a request, from the first mobile device or the second mobile device, to identify a new meeting point;

in response to the request, identify a new meeting point; and communicate the new meeting point for visual presentation on the first mobile device and the second mobile device.

14. The server of claim 9, wherein the processing circuitry and the communications interface further operate according to the program code to:

receive profile information relating to the second dog; and communicate the profile information for presentation on the first mobile device.

15. The server of claim 9, wherein the processing circuitry and the communications interface further operate according to the program code to:

prior to identifying a meeting point for the first dog and the second dog, receive a request, from the first mobile device, to meet with the second dog;

communicate the request to the second mobile device; and receive, from the second mobile device, an acceptance of the request.

16. The server of claim 9, wherein the communications interface further operates according to the program code to:

receive periodic updates to the first geolocation information and the second geolocation information.

17. The server of claim 9, wherein the electronic data received from a sensor attached to the first dog indicates that the first dog is proximate the first mobile device.

18. A mobile device, comprising:

a communication interface configured to support communications with a cloud server;

a display;

processing circuitry operably coupled to the communication interface and the display;

memory coupled to the processing circuitry, the memory storing application software, wherein upon execution of the application software the processing circuitry operates to:

receive electronic data from a sensor attached to a first dog, wherein the electronic data provides an indication that the first dog is proximate the mobile device;

communicate first geolocation information relating to the location of the mobile device to the cloud server;

receive second geolocation information from the cloud server relating to the location of a second dog;

receive meeting point location information for a meeting point that is approximately equidistance from the location of the mobile device and the location of the second dog;

receive routing information identifying a travel route between the location of the mobile device and the meeting point; and present a user interface and map on the display, the map including the location of the mobile device, the location of the second dog, and the travel route.

19. The mobile device of claim 18, wherein the processing circuitry further operates to:

receive information identifying at least one dog-friendly point of interest proximate the meeting point; and present the dog-friendly point of interest on the map.

20. The mobile device of claim 18, wherein the user interface includes an option to request a new meeting point from the cloud server.

* * * * *